United States Patent
Kamada et al.

(10) Patent No.: US 12,276,573 B2
(45) Date of Patent: Apr. 15, 2025

(54) WATER LEAKAGE POSITION ESTIMATION SYSTEM, WATER LEAKAGE POSITION ESTIMATION METHOD, AND WATER LEAKAGE POSITION ESTIMATION PROGRAM

(71) Applicant: HITACHI, LTD., Tokyo (JP)

(72) Inventors: Yuudai Kamada, Tokyo (JP); Toshiyuki Mine, Tokyo (JP)

(73) Assignee: HITACHI, LTD., Tokyo (JP)

( * ) Notice: Subject to any disclaimer, the term of this patent is extended or adjusted under 35 U.S.C. 154(b) by 256 days.

(21) Appl. No.: 17/925,537

(22) PCT Filed: Mar. 16, 2021

(86) PCT No.: PCT/JP2021/010566
§ 371 (c)(1),
(2) Date: Nov. 15, 2022

(87) PCT Pub. No.: WO2021/235064
PCT Pub. Date: Nov. 25, 2021

(65) Prior Publication Data
US 2023/0194378 A1   Jun. 22, 2023

(30) Foreign Application Priority Data
May 22, 2020   (JP) ................................. 2020-089465

(51) Int. Cl.
*G01M 3/24*   (2006.01)
*G01M 7/02*   (2006.01)
(52) U.S. Cl.
CPC ............ *G01M 3/243* (2013.01); *G01M 7/025* (2013.01)
(58) Field of Classification Search
CPC ........... G01M 3/24; G01M 3/243; F17D 5/02; F17D 5/06
See application file for complete search history.

(56) References Cited

U.S. PATENT DOCUMENTS

| | | | |
|---|---|---|---|
| 8,959,983 B2* | 2/2015 | Schuberth | G06F 17/10 73/40.5 A |
| 10,565,752 B2* | 2/2020 | Perrier | G06T 11/001 |
| 2023/0008984 A1* | 1/2023 | Dupont | G01F 25/10 |

FOREIGN PATENT DOCUMENTS

| | | |
|---|---|---|
| JP | 2018-151343 A | 9/2018 |
| JP | 2018-205192 A | 12/2018 |
| JP | 2019-039858 A | 3/2019 |

OTHER PUBLICATIONS

Search Report mailed Jun. 1, 2021 in International Application No. PCT/JP2021/010566.

(Continued)

*Primary Examiner* — Erika J. Villaluna
(74) *Attorney, Agent, or Firm* — Miles & Stockbridge, P.C.

(57) ABSTRACT

A water leakage position estimation system(S) configured to estimate a water leakage position in a pipe network including a plurality of pipe routes includes a water leakage determination unit (11) and an estimation unit (12*e*). The water leakage determination unit (11) determines whether a water leakage occurs in the pipe network based on a measured value of a vibration related to the pipe network that is acquired by a water leakage sensor (2) provided in the pipe network. The estimation unit (12*e*) estimates, when the water leakage determination unit (11) determines that a water leakage occurs in the pipe network, a pipe route in which the water leakage occurs from the plurality of pipe routes based on the measured value and a predicted value of the vibration for each pipe route acquirable by the water leakage sensor (2) when a water leakage occurs in each pipe route.

12 Claims, 14 Drawing Sheets

(56) References Cited

OTHER PUBLICATIONS

Written Opinion mailed Jun. 1, 2021 in International Application No. PCT/JP2021/010566.

* cited by examiner

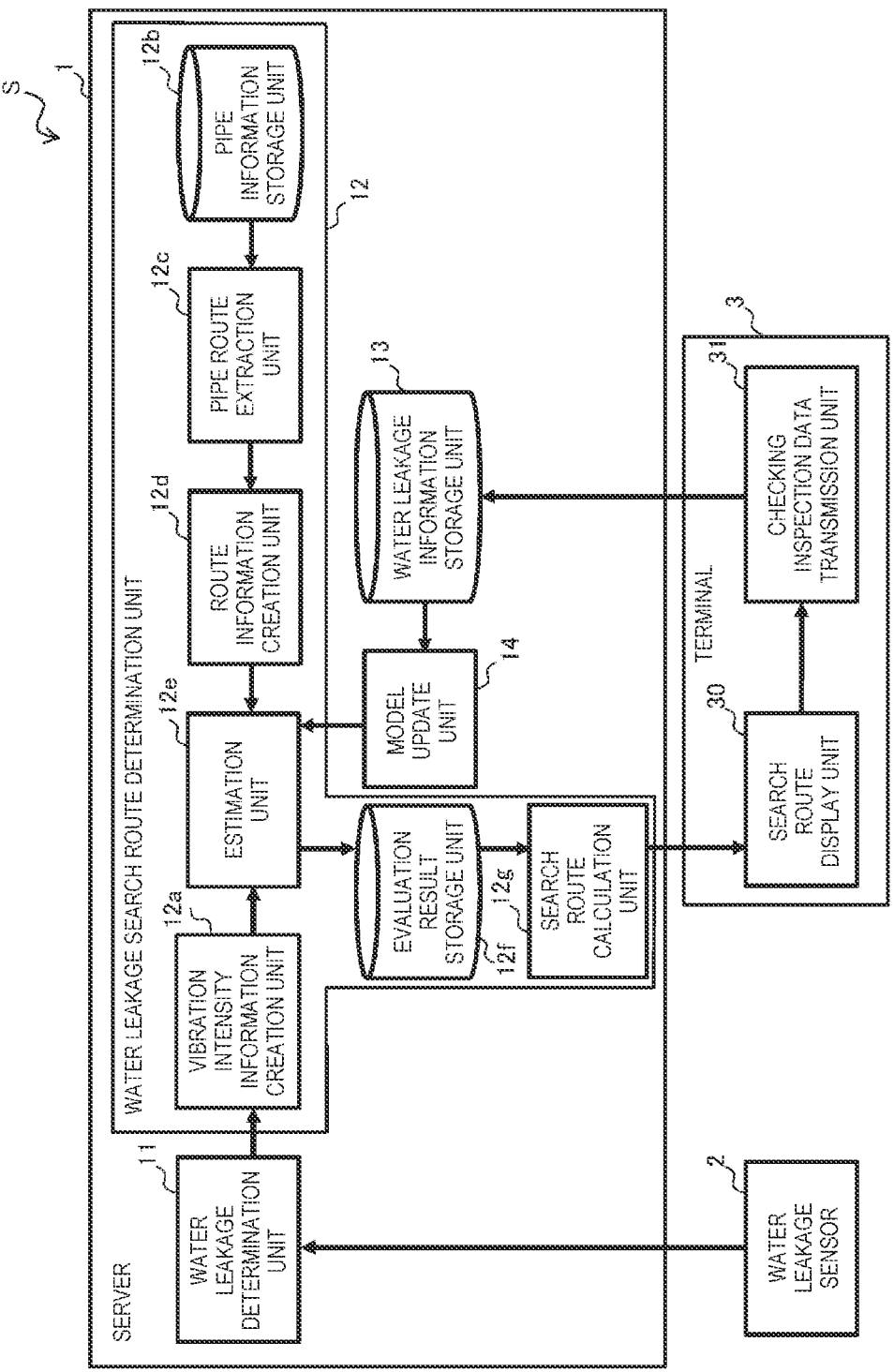
[FIG. 1]

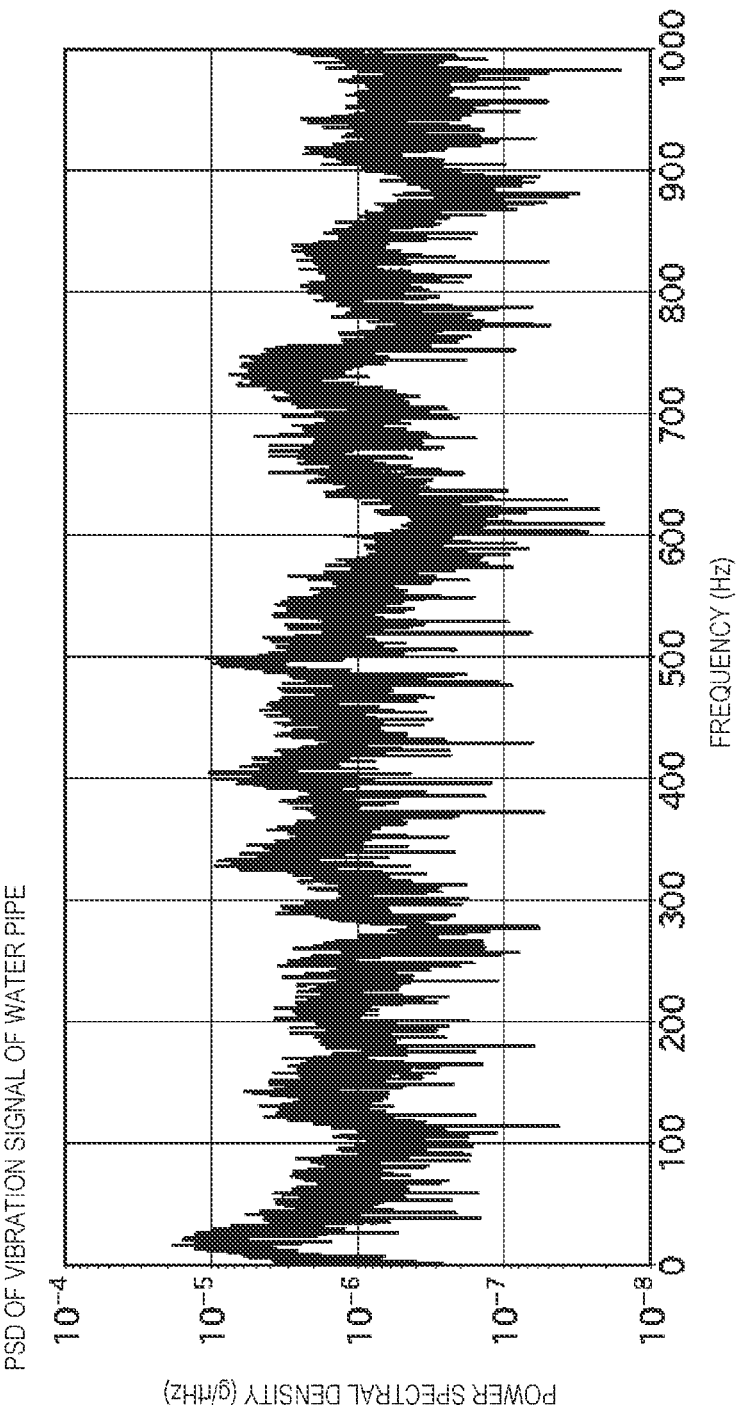
[FIG. 2]

[FIG. 3]

VIBRATION INTENSITY INFORMATION (LOGARITHM) OF WATER PIPE

| FREQUENCY (Hz) | 400~450 | 450~500 | 500~550 | 550~600 | 600~650 | 650~700 | 700~750 | 750~800 | 800~850 | 850~900 | 900~950 | 950~1000 | PSD MEASURED VALUE (SUM) |
|---|---|---|---|---|---|---|---|---|---|---|---|---|---|
| PSD (LOGARITHM) | -0.04 | 0.49 | 0.45 | -0.29 | -0.06 | -0.09 | 0.11 | -0.20 | -0.15 | -0.56 | -0.31 | -0.48 | -0.95 |
| PSD (NORMALIZED) | 1 | -12.3 | -11.3 | 7.3 | 1.5 | -2.3 | -2.8 | 5 | 3.8 | 14 | 7.8 | 12 | 23.7 |

~12Ta

[FIG. 4]
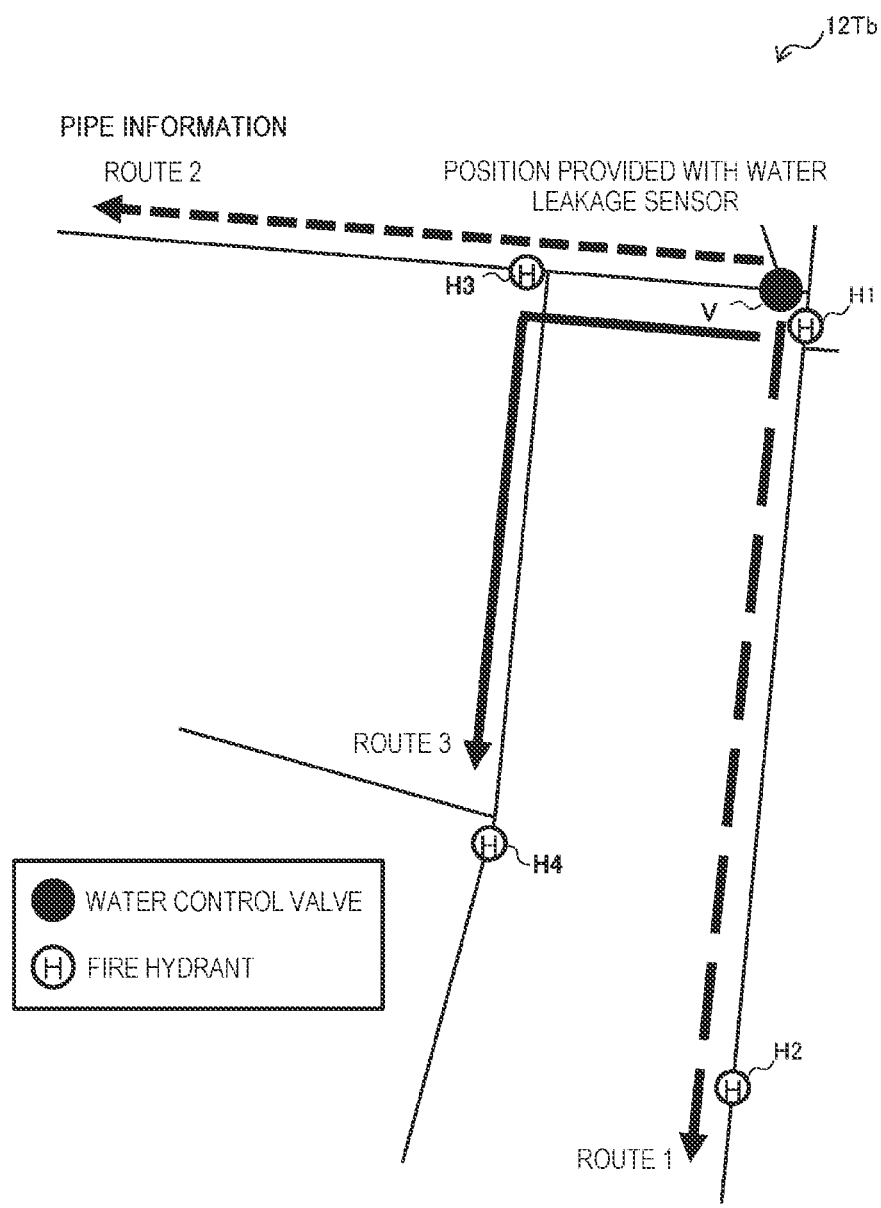

[FIG. 5]

ROUTE INFORMATION

PIPE ROUTE = ROUTE 1, PIPE TYPE = DA75 ~12Td

| | 1 | 2 | 3 | 4 | 5 | ... | 85 | 86 | 87 | 88 | 89 | ... | PSD (NORMALIZED) MEASURED VALUE |
|---|---|---|---|---|---|---|---|---|---|---|---|---|---|
| PIPE LENGTH (m) | 1 | 2 | 3 | 4 | 5 | ... | 85 | 86 | 87 | 88 | 89 | ... | - |
| NUMBER OF BRANCHES | 0 | 0 | 0 | 1 | 1 | ... | 2 | 2 | 2 | 2 | 2 | ... | - |
| NUMBER OF WATER CONTROL VALVES | 0 | 0 | 0 | 0 | 0 | ... | 0 | 0 | 0 | 1 | 1 | ... | - |
| PSD (NORMALIZED) PREDICTED VALUE | 27.9 | 27.5 | 27.1 | 26.7 | 26.3 | ... | 27.6 | 26.8 | 24.0 | 23.2 | 22.4 | ... | 23.7 |
| EVALUATION INDEX (DIFFERENCE BETWEEN PREDICTED VALUE AND MEASURED VALUE) | 4.2 | 3.8 | 3.4 | 3.0 | 2.6 | ... | 3.9 | 3.1 | 0.3 | -0.5 | -1.3 | ... | - |

PIPE ROUTE = ROUTE 2, PIPE TYPE = ...

| | 1 | 2 | 3 | 4 | 5 | ... | 43 | 44 | 45 | 46 | 47 | ... | PSD (NORMALIZED) MEASURED VALUE |
|---|---|---|---|---|---|---|---|---|---|---|---|---|---|
| PIPE LENGTH (m) | 1 | 2 | 3 | 4 | 5 | ... | 43 | 44 | 45 | 46 | 47 | ... | - |

PIPE ROUTE = ROUTE 3, PIPE TYPE = ...

| | 1 | 2 | 3 | 4 | 5 | ... | 43 | 44 | 45 | 46 | 47 | ... | PSD (NORMALIZED) MEASURED VALUE |
|---|---|---|---|---|---|---|---|---|---|---|---|---|---|
| PIPE LENGTH (m) | 1 | 2 | 3 | 4 | 5 | ... | 43 | 44 | 45 | 46 | 47 | ... | - |

[FIG. 6]

WATER LEAKAGE INFORMATION

13T

| No | PARAMETER ||| PSD (NORMALIZED) ACTUALLY MEASURED VALUE |||||||||||||| PSD (NORMALIZED) ACTUALLY MEASURED VALUE (SUM) |
|---|---|---|---|---|---|---|---|---|---|---|---|---|---|---|---|
| | PIPE TYPE | PIPE LENGTH | NUMBER OF BRANCHES | NUMBER OF WATER CONTROL VALVE | 400~450 | 450~500 | 500~550 | 550~600 | 600~650 | 650~700 | 700~750 | 750~800 | 800~850 | 850~900 | 900~950 | 950~1000 | |
| 1 | DA75 | 24.5 | 1 | 1 | 1 | 1.04 | 0.93 | 1.07 | 0.96 | 1.05 | 1.04 | 1.02 | 0.98 | 0.97 | 0.91 | 0.91 | 11.9 |
| 2 | DA75 | 64 | 1 | 0 | 1 | 1.09 | 1.05 | 1.02 | 0.98 | 1.03 | 1.04 | 0.95 | 0.95 | 0.91 | 0.88 | 0.83 | 11.8 |
| ... | ... | ... | ... | ... | ... | ... | ... | ... | ... | ... | ... | ... | ... | ... | ... | ... | ... |

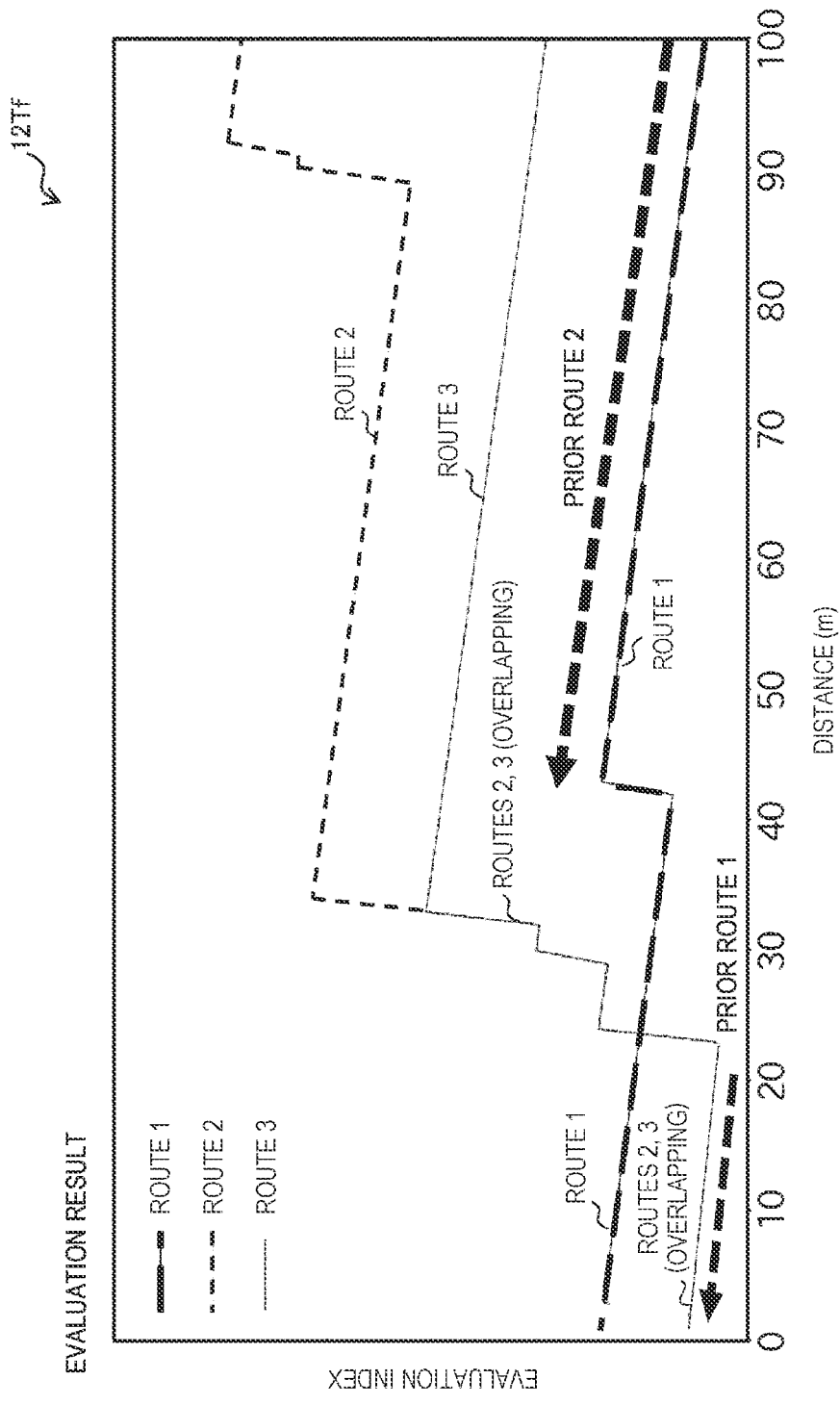
[FIG. 7A]

[FIG. 7B]
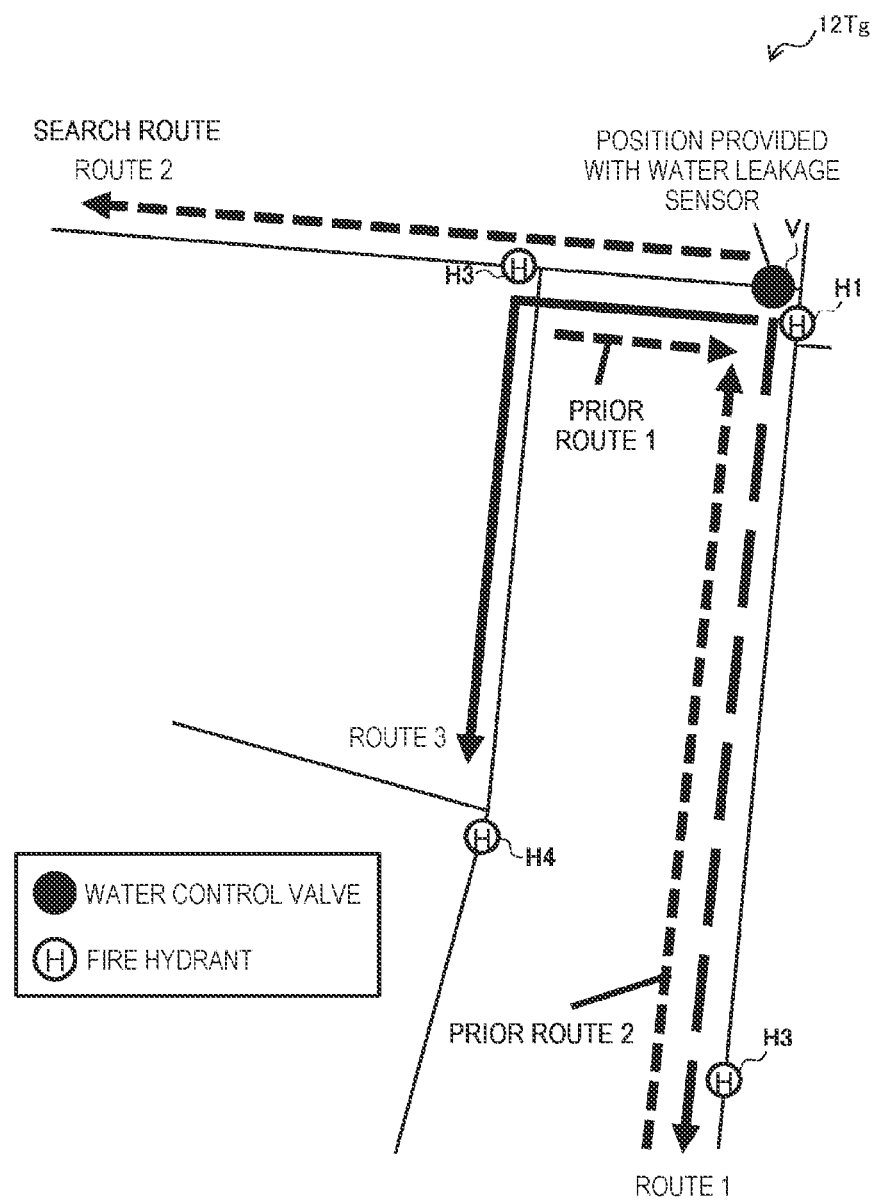

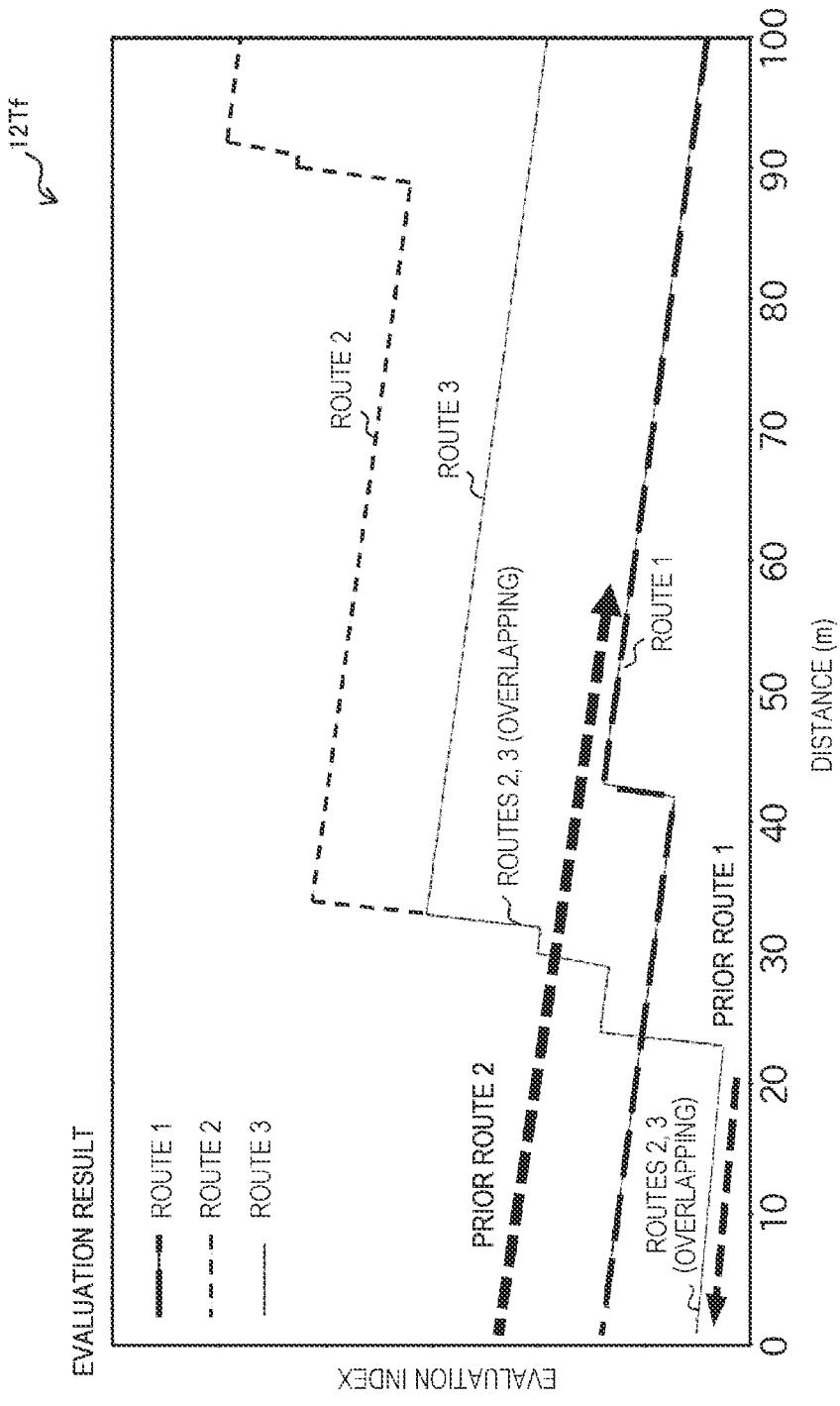
[FIG. 8A]

[FIG. 8B]
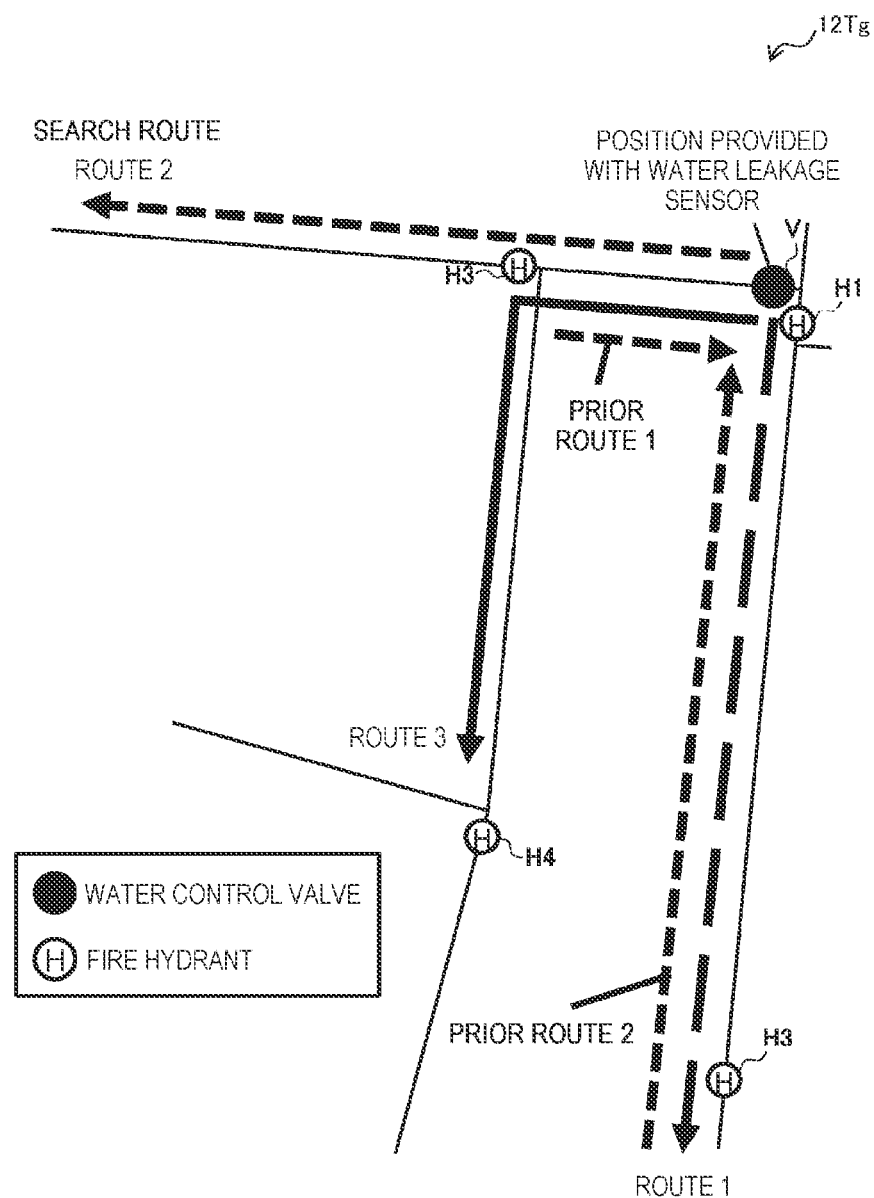

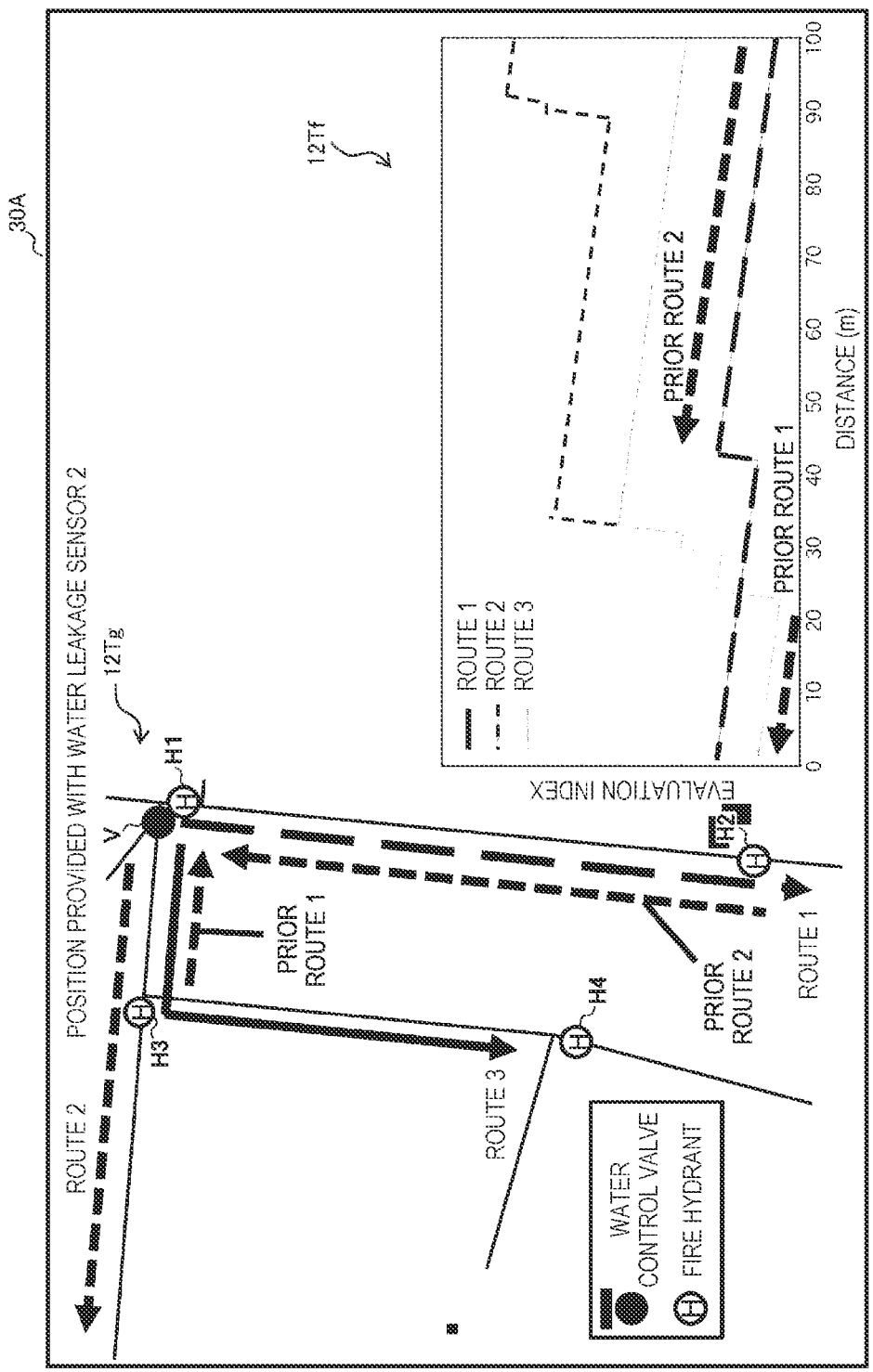
[FIG. 9]

[FIG. 10]
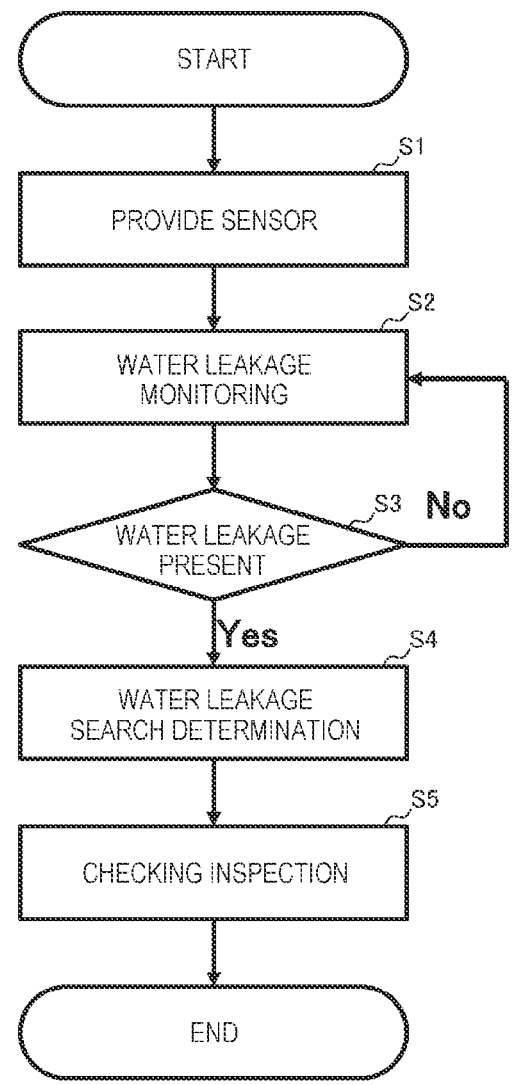

[FIG. 11]
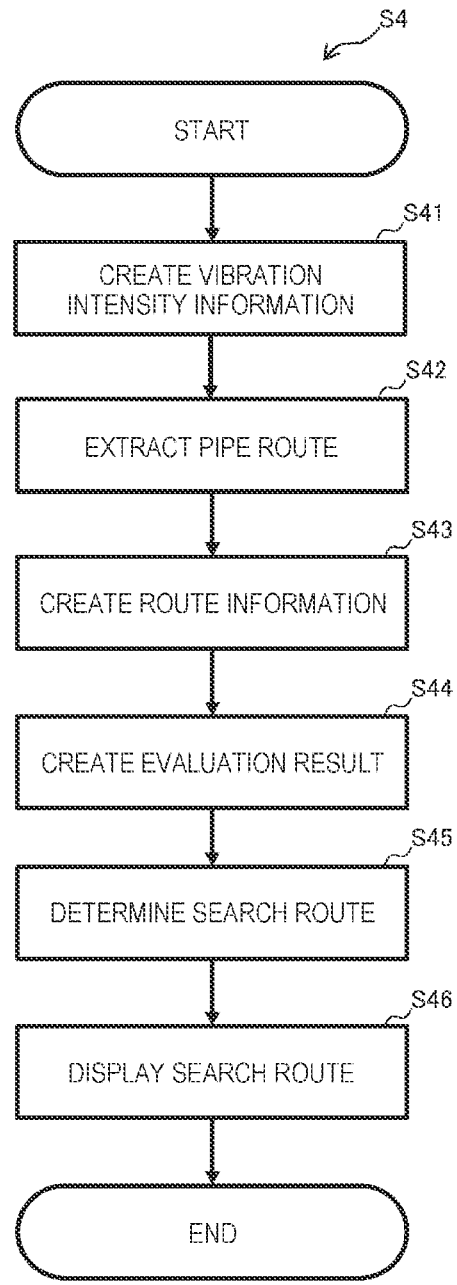

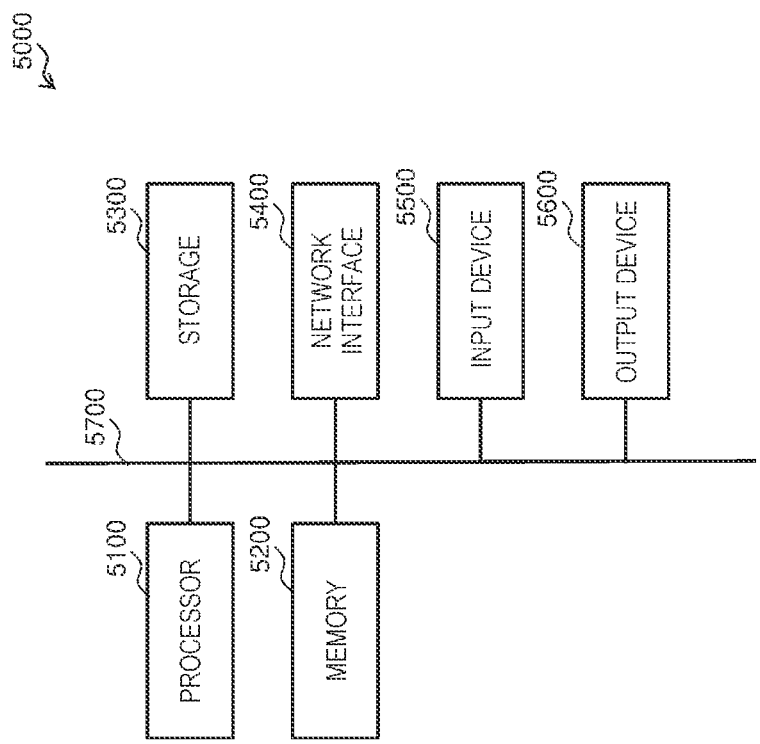
[FIG. 12]

WATER LEAKAGE POSITION ESTIMATION SYSTEM, WATER LEAKAGE POSITION ESTIMATION METHOD, AND WATER LEAKAGE POSITION ESTIMATION PROGRAM

TECHNICAL FIELD

The present invention relates to a technique for estimating a water leakage position of a pipe buried in the ground such as a water pipe.

BACKGROUND ART

Due to progress of aging of water pipes, which are pipes buried in the ground, frequent occurrence of water leakage is predicted, while it is expected difficult to specify a water leakage position due to a decrease in the number of skilled workers responsible for management work of water pipes. As a technique for estimating a water leakage position of a water pipe, for example, a technique is disclosed in PTL 1. In PTL 1, regarding water leakage sounds respectively observed by sensors provided at two positions, it is estimated that a water leakage sound having a high ratio of a high-frequency component to a low-frequency component is closer to a water leakage position as compared with a water leakage sound having a low ratio of the high-frequency component to the low-frequency component. Further, a position which is an extrapolated position on a position side close to the water leakage position and at which the ratio of the high-frequency component to the low-frequency component coincides with an assumed value of the water leakage position is estimated as the water leakage position (for example, refer to FIG. 3 of PTL 1).

CITATION LIST

Patent Literature

PTL 1: JP-A-2019-39858

SUMMARY OF INVENTION

Technical Problem

However, in the above-described PTL 1, a miss detection of water leakage occurs when no water leakage sound is detected by any one of the sensors provided at the two positions. In addition, since the ratio of the high-frequency component to the low-frequency component of the water leakage sound does not monotonically decrease from an actual water leakage point, it is not possible to accurately estimate the water leakage point even by using extrapolation with respect to the water leakage sound having a high ratio and the water leakage sound having a low ratio. In addition, since the assumed value of the ratio of the high-frequency component to the low-frequency component of the water leakage point is not uniquely determined, the water leakage point cannot be accurately estimated even when the assumed value of the water leakage point is used.

The invention has been made in view of the above-described problems, and an object of the invention is to estimate a leakage point of a pipe buried in the ground more accurately by using a single sensor provided at one position.

Solution to Problem

In order to solve the above problems, according to the invention, a water leakage position estimation system configured for estimating a water leakage position in a pipe network including a plurality of pipe routes includes a determination unit and an estimation unit. The determination unit determines whether a water leakage occurs in the pipe network based on a measured value of a vibration related to the pipe network that is acquired by a sensor provided in the pipe network. The estimation unit estimates, when the determination unit determines that a water leakage occurs in the pipe network, a pipe route in which the water leakage occurs from the plurality of pipe routes based on the measured value and a predicted value of the vibration for each pipe route. The predicted value of the vibration for each of the pipe routes is a value of the vibration that can be acquired by the sensor when a water leakage occurs in each of the pipe routes.

Advantageous Effects of Invention

According to the invention, it is possible to more accurately estimate a leakage point of a pipe buried in the ground by using a single sensor.

Problems, configurations, and effects other than those described above will be apparent from the following description of embodiments for carrying out the invention.

BRIEF DESCRIPTION OF DRAWINGS

FIG. 1 is a diagram showing a configuration of a water leakage position estimation system according to an embodiment.

FIG. 2 is a diagram showing a PSD distribution of a vibration signal of a water pipe.

FIG. 3 is a diagram showing vibration intensity information (logarithm) of a water pipe.

FIG. 4 is a diagram showing pipe information.

FIG. 5 is a diagram showing route information.

FIG. 6 is a diagram showing water leakage information.

FIG. 7A is a diagram showing a first example of an evaluation result.

FIG. 7B is a diagram showing a first example of a search route.

FIG. 8A is a diagram showing a second example of the evaluation result.

FIG. 8B is a diagram showing a second example of the search route.

FIG. 9 is a diagram showing a display screen displayed on a search route display unit.

FIG. 10 is a diagram showing a water leakage detection operation flow.

FIG. 11 is a flowchart showing a water leakage search route determination process.

FIG. 12 is a hardware diagram of a computer that implements a server and a terminal.

DESCRIPTION OF EMBODIMENTS

Hereinafter, embodiments of the invention will be described with reference to the drawings. The embodiments are examples for describing the invention, and omission and simplification are appropriately made for clarified description. The invention can be implemented in other various forms. Unless otherwise specified, the number of respective components may be singular or plural.

In order to facilitate understanding of the invention, a position, a size, a shape, a range, or the like of each component shown in the drawings may not represent an actual position, size, shape, Therefore, the invention is not necessarily limited to the position, size, shape, range, or the like illustrated in the drawings.

Examples of various types of information may be described by expressions such as "table", "list", and "queue", but the various types of information may be expressed by a data structure other than these expressions. For example, the various types of information such as "XX table", "XX list", and "XX queue" may be "XX information". When identification information is described, expressions such as "identification information", "identifier", "name", "ID", and "number" are used, but these expressions may be replaced with one another.

When there are a plurality of components having the same or similar functions, different subscripts may be added to the same reference numeral. When it is not necessary to distinguish the plurality of components from one another, the subscripts may be omitted in the description.

In the embodiment, a process performed by executing a program may be described. Here, a computer executes the program by a processor (for example, a CPU or a GPU), and performs the process, that is defined by the program, using a storage resource (for example, a memory), an interface device (for example, a communication port), or the like. Therefore, a subject of the process performed by executing the program may be the processor. Similarly, the subject of the process performed by executing the program may be a controller, a device, a system, a computer, or a node including the processor. The subject of the process performed by executing the program may be a calculation unit, and may include a dedicated circuit that executes a specific process. Here, the dedicated circuit refers to, for example, a field programmable gate array (FPGA), an application specific integrated circuit (ASIC), and a Complex programmable logic device (CPLD).

The program may be installed on a computer from a program source. The program source may be, for example, a program distribution server or a storage medium readable by computer. When the program source is a program distribution server, the program distribution server may include a processor and a storage resource that stores a program to be distributed, and the processor of the program distribution server may distribute the program to be distributed to another computer. In the embodiment, two or more programs may be implemented as one program, or one program may be implemented as two or more programs.

In the following embodiment, a water leakage position estimation system that performs water leakage detection of a water supply pipe, specification of a water leakage position, and the like will be described as an example of a monitoring system of a buried pipe infrastructure. The invention is not limited thereto, and the monitoring system can be applied to leakage detection, specification of a leakage position, and the like in other pipes such as a gas pipe by using a sensor having a characteristic corresponding to a purpose.

In the following embodiments, a vibration signal (sound pressure) of a water supply pipe buried in the ground is detected by a single water leakage sensor that is disposed in one water control valve or the like under a manhole and has a wireless communication function. The detected vibration signal is transmitted to a remote server by the wireless communication function. The server estimates a position where an abnormal sound is generated based on the vibration signal, and displays a search route of a recommended water leakage position on a display unit based on the estimation result.

Embodiment

First, a background of the present embodiment will be described. Theoretically, an intensity (sound pressure) of an acoustic signal in a water supply pipe (hereinafter, referred to as a water pipe or a pipe) buried in the ground attenuates exponentially in accordance with a distance from a sound source. In consideration of a case where a plurality of pipes having different conditions (parameters) characterizing the pipes, such as a material type and a nominal diameter of the pipe, are connected, a sound pressure Y is expressed as in Equation 1. Equation 2 is obtained by taking logarithms of both sides of Equation 1.

$$Y = a \prod_i e^{-bx_i} \qquad \text{[Equation 1]}$$

$$\log_e Y = -\sum_i bx_i + \log_e a \qquad \text{[Equation 2]}$$

Y: Sound pressure $x_i$: (m) of each connected pipe for each condition characterizing the pipe Coefficient a: of magnitude of sound pressure at sound source (magnitude at a distance of 0 m)

Coefficient b: Attenuation rate of sound pressure

The sound pressure Y changes according to the attenuation rate and a distance between a sensor and a water leakage point, Therefore, a statistical correlation can be expected between pipe information (geometry) and an intensity of a water leakage vibration in the pipe detected at the time of water leakage. Further, based on Equation 2, it can be expected that the logarithm of the sound pressure Y can be expressed by a linear sum of values depending on the conditions (parameters) characterizing the pipes.

Therefore, in the present embodiment, a multiple regression model representing the correlation between the pipe information and an: intensity of a water leakage vibration actually generated in the past is created. Then, a water leakage position is estimated based on a predicted value and a measured value of a newly detected intensity of the water leakage vibration. The predicted value is an output when pipe information of a pipe network in which a water leakage vibration is newly detected is input to the multiple regression model. Then, based on the estimated water leakage position, a search route for searching for an actual water leakage position is determined and displayed, so that water leakage detection can be efficiently performed.

(Water Leakage Position Estimation System S)

FIG. 1 is a diagram showing a configuration of a water leakage position estimation system S. The water leakage position estimation system S includes a server 1, a water leakage sensor 2, and a terminal 3. The server 1 includes a water leakage determination unit 11, a water leakage search route determination unit 12, a water leakage information storage unit 13, and a model update unit 14, The water leakage search route determination unit 12 further includes a vibration intensity information creation unit 12*a*, a pipe information storage unit 12*b*, a pipe route extraction unit 12*c*, a route information creation unit 12*d*, an estimation unit 12*e*, an evaluation result storage unit 12*f*, and a search route calculation unit 12g. Although it is assumed that the server 1 is constructed on a cloud, the server 1 may be constructed in an on-premises manner.

The water leakage sensor 2 is a single mobile sensor disposed in a water control valve or the like under a manhole when a water leakage detection operation is performed. The water leakage sensor 2 is provided in one water control valve in a water leakage detection target, which is a pipe network including a plurality of pipe routes, detects a vibration signal of each pipe route, and transmits the detected vibration signal to the server 1 via a wireless communication function.

The terminal 3 is a mobile terminal for an inspector, and performs a checking inspection by using a listening stick or the like from the ground above a pipe and performs a checking inspection for specifying a position where a vibration sound caused by water leakage is generated. The terminal 3 includes a search route display unit 30 and a checking inspection data transmission unit 31.

The water leakage determination unit 11 performs water leakage monitoring (S2 and S3 in FIG. 10) and water leakage determination (S4 in FIG. 10). In the water leakage monitoring, the water leakage determination unit 11 receives a vibration signal (measured waveform) measured by the water leakage sensor 2 provided in the water control valve via the wireless communication function, calculates an auto-correlation coefficient of the received vibration signal, and extracts a plurality of peaks as time elapses. Then, the water leakage determination unit 11 compares positions of the plurality of extracted peaks, determines that there is a water leakage when a ratio of matching peak positions exceeds a threshold, and determines that there is no water leakage when the ratio is equal to or less than the threshold.

When it is determined that there is a water leakage, the water leakage determination 11 outputs an instruction to the water leakage search route determination unit 12 to execute water leakage search route determination (S4 in FIG. 10 and FIG. 11) on the pipe network as the water leakage detection target, in which the water leakage sensor 2 determining that there is a water leakage is provided.

Units of the water leakage search route determination unit 12 execute the following processes to execute the water leakage search route determination when being instructed by the water leakage determination unit 11.

The vibration intensity information creation unit 12a calculates a power spectral density (PSD) of the vibration signal determined as water leakage present by the water leakage determination unit 11. FIG. 2 is a diagram showing a PSD distribution of a vibration signal of a water pipe. FIG. 2 shows, for example, the PSD distribution at a frequency of 0 to 1000 Hz of a pipe having a pipe type=DA75.

As shown in FIG. 3, the vibration intensity information creation unit 12a calculates a logarithm of a vibration intensity based on the PSD distribution at a frequency of 400 Hz to 1000 Hz for each divided frequency band (PSD (logarithm) in FIG. 3), FIG. 3 is a diagram Showing vibration intensity information (logarithm) 12Ta of a water pipe. Then, the PSD (logarithm) of each frequency band is normalized with the PSD (logarithm) at the frequency of 400 to 450 Hz being 1 (PSD (normalized) in FIG. 3). By the normalization, it is possible to perform analysis independent of an absolute value of the vibration intensity (water leakage amount).

In the example of FIG. 3, −0.95, which is a sum of PSDS (logarithms) of the frequency bands of 400 Hz to 1000 Hz, is a PSD (logarithm) measured value, and 23.7, which is a sum of PSDs (normalized), is a PSD (normalized) measured value. In the present embodiment, the vibration intensity information creation unit 12a outputs the PSD (normalized) measured value to the estimation unit 12e.

Meanwhile, the pipe route extraction unit 12c extracts a pipe route from pipe information 12Tb which is stored in the pipe information storage unit 12b and corresponds to the water leakage sensor 2 determined as water leakage present by the water leakage determination unit 11. The pipe route extracted here is a pipe route within a predetermined search distance (for example, 100 m to 150 m) from the water control valve among pipe routes that are connected to the water control valve water leakage sensor 2 is provided and that are provided in the pipe network as the water leakage detection target.

FIG. 4 is a diagram showing the pipe information 12Tb. The water leakage sensor 2 provided in a water control valve V shown in FIG. 4 is a water leakage sensor determined as water leakage present by the water leakage determination unit 11.

The pipe information 12Tb is map information including a pipe type (material), a pipe length for each pipe type, a pipe diameter for each pipe type, a position of a water control valve, a position of a fire hydrant, and a position and a type (a T-shape branch or a cross branch) of a branch into data for each pipe route in the target pipe network, or is obtained by converting map information. Based on the map information, for each pipe route, the route information including at least one of the pipe length for each pipe type, the pipe diameter for each pipe type, and the number of water control valves, the number of fire hydrants, and the number and types of branches is obtained for each distance from the water control valve V provided with the water leakage sensor 2.

In the example of FIG. 4, three pipe routes including route 1, route 2, and route 3 are extracted from the pipe information 12Tb. Route 1 is a pipe route from a fire hydrant H1 to a fire hydrant H2 starting from the water control valve V provided with the water leakage sensor 2. Route 2 is a pipe route that passes through a fire hydrant H3 starting from the water control valve V and is directed in a direction away from the fire hydrant H3. Route 3 is a pipe route that starts from the water control valve V, overlaps with Route 2 from the water control valve V to a branch before the fire hydrant H3, branches from Route 2 at this branch, and is directed toward a fire hydrant H4.

The route information creation unit 12d creates the route information 12Td based on the pipe routes extracted by the pipe route extraction unit 12c. FIG. 5 is a diagram showing the route information 12Td. In the example of FIG. 5, one combination of values (the pipe length (m), the number of branches, the number of water control valves) for each pipe route and each pipe type is one piece of route information. In the example of FIG. 5, for each pipe route and each pipe type, the route information creation unit 12d inputs, to the route information 12Td, a total of branches (the number of branches) and a total of water control valves (the number of water control valves) that are present in the pipe from the water control valve V provided with the water leakage sensor 2 up to a distance corresponding to the "pipe length".

As shown in FIG. 5, for example, in the pipe length=85 m of the pipe route=route 1 and the pipe type=DA75, since there are two branches in the pipe from the water leakage sensor 2 and there is no water control valve, 2 is input to the number of branches and 0 is input to the number of water control valves. The number of branches and the number of water control valves are obtained based on the pipe routes extracted from the pipe information 12Tb by the pipe route extraction unit 12c. The number of branches and the number of water control valves are input in the same manner for Route 2 and Route 3.

The estimation unit 12e reflects a signal estimation model generated and updated by the model update unit 14 in the route information 12Td. By reflecting the signal estimation model, a PSD (normalized) predicted value corresponding to one piece of route information, which is the combination (the pipe length (m), the number of branches, the number of water control valves) for each pipe route and each pipe type, is input to the route information 12Td. Each PSD (normalized) predicted value is obtained as an output by inputting each piece of route information to a model obtained by the model update unit 14 performing multiple regression analysis or the like to analyze water leakage information 13T (FIG. 6) stored in the water leakage information storage unit 13.

FIG. 6 is a diagram showing the water leakage information 13T. The water leakage information 13T includes information on the water leakage position that is detected by the individual checking inspection by the inspector and transmitted from the terminal 3. In the water leakage information 13T, PSD (normalized) actually measured values for all frequency bands and a sum thereof (PSD (normalized) actually measured value (sum)) acquired as a checking inspection result of an actual water leakage inspection are associated with each piece of route information which is a combination of the pipe type, the pipe length, the number of branches, and the number of water control valves. One combination of the pipe type, the pipe length, the number of branches, and the number of water control valves is one piece of route information. That is, the model update unit 14 performs the multiple regression analysis on correspondence relationship among the route information, the PSD (normalized) actually measured value, and the PSD (normalized) actually measured value (sum) in each record of the water leakage information 13T, Then, the model update unit 14 generates the multiple regression model that outputs the PSD (normalized) predicted value when the pipe type, the pipe length, the number of branches, and the number of water control valves are input.

In addition, the estimation unit 12e stores the PSD (normalized) measured value ("23.7" in FIG. 5) output by the vibration intensity information creation unit 12a in the route information 12Td. Then, the estimation unit 12e calculates a difference between the PSD (normalized) predicted value and the PSD (normalized) measured value corresponding to all the route information of the route information 12Td as an evaluation index.

In addition, the estimation unit 12e estimates, as a water leakage position, a position corresponding to the route information in which an absolute value of the difference (evaluation index) is the smallest in all the target pipe routes or each pipe route. In the example of FIG. 5, a position at which the absolute value of the difference has a minimum value of 0.3 and the pipe length=87 m of the pipe route=route 1 and the pipe type=DA75 is the estimated water leakage position. The route information 12Td is stored in a predetermined storage area of the estimation unit 12e.

In addition, the estimation unit 12e generates a graph (evaluation result 12Tf) in which a position of the water control valve V (FIG. 4) is set as a starting point, the pipe length is set as a horizontal axis, the evaluation index corresponding to each pipe length is set as a vertical axis, and each point of the evaluation index corresponding to the pipe length is plotted for each of all the pipe routes of the route information 12Td. FIG. 7A is a diagram showing a first example of the evaluation result 12Tf. The evaluation result 12Tf is stored in the evaluation result storage unit 12f.

Based on the evaluation result 12Tf, the search route calculation unit 12g determines a search route 12Tg having a high probability that the inspector finds the water leakage position. FIG. 7B is a diagram showing a first example of the search route 12Tg.

For example, in the evaluation result 12Tf, the search route calculation unit 12g selects a pipe route, a search direction, and a search range in which a value of the evaluation index of the vertical axis is within a predetermined range in a range of a predetermined search distance (for example, 100 m to 150 m) around the water control valve V. A pipe route having a relatively small evaluation index may be selected regardless of whether the evaluation index is within the predetermined range. In the example of FIG. 7A, the evaluation index is the minimum in Routes 2 and 3 (overlapping) and is the second minimum in Route 1 in a range in which the distance (the pipe length of the route information) is 0 m to about 23 m, and is the minimum in Route 1 in a range in which the distance is about 23 m to 100 m.

Therefore, in the example of FIG. 7A, in the range of 0 m to about 23 m, a search route that moves in a direction from about 23 m toward 0 m (a direction toward the water control valve V) in which an evaluation index is smaller than those of Routes 2 and 3 is determined as Prior Route 1 having a first place in priority. In addition, in the range of about 23 m to 100 m, a search route that moves on Route 1 in a direction from 100 m toward 0 m in which an evaluation index is smaller is determined as Prior Route 2 having a second place in priority. In a sum of distances of Prior Routes 1 and 2 up to this point, a search distance is about 123 m, which is within a limit of the search range. The search route calculation unit 12g determines the search route 12Tg shown in FIG. 7B in this manner.

Alternatively, as the second example, the search route calculation unit 12g may determine the search route as follows. As shown in FIG. 8A, in the second example, Prior Route 1 is obtained in the same manner as in FIG. 7A. However, Prior Route 2 may be a route in which Prior Route 1 reaches the water control valve V (distance 0 m), and turns back by moving along Route 1 having the second smallest evaluation index as compared with Routes 2 and 3 in a direction away from the water control valve V with the water control valve V (distance 0 m) as the starting point.

As described above, the search route calculation unit 12g determines the search route 12Tg including efficient search order and search direction from the pipe routes in which the evaluation index satisfies the predetermined condition within the range of the predetermined search distance (for example, 100 m to 150 m), while considering a positional relationship between the pipe route and the water control valve.

In addition, the search route calculation unit 12g transmits data on the evaluation result 12Tf and the search route 12Tg to the terminal 3, and causes the search route display unit 30 to display the data. FIG. 9 is a diagram showing a search route display screen 30A displayed on the search route display unit 30. The search route display screen 30A includes the evaluation result 12Tf and the search route 12Tg that is identifiably displayed together with the priority.

FIG. 10 is a diagram showing a water leakage detection operation flow. The water leakage detection operation flow indicates a series of procedures to be performed at the time of water leakage detection. In the water leakage detection operation, first, the water leakage sensor 2 is provided in the water control valve in the pipe network as the water leakage detection target by the inspector who performs the checking inspection of the water leakage (S1). Next, the water leakage determination unit 11 of the server 1 receives the vibration signal of the water pipe detected by the water leakage sensor 2, and determines the presence or absence of the water leakage (S2). When there is a water leakage in the pipe route as the water leakage detection target (Yes in S3), the server 1 moves the process to S4, and when there is no water leakage (No in S3), the server 1 repeats S2.

In S4, the water leakage search route determination unit 12 of the server 1 performs water leakage search determination (described later with reference to FIG. 11). Next, the inspector performs the checking inspection of searching the water leakage position by the listening stick or the like based on the search route display screen 30A received from the server 1 by the terminal 3 and displayed on the search route display unit 30. The inspector operates the terminal 3 to transmit the checking inspection result (see FIG. 6) to the server 1 via the checking inspection data transmission unit 31.

FIG. 11 is a flowchart showing the water leakage search route determination (S4 of FIG. 10). The water leakage search route determination is executed by the water leakage search route determination unit 12 of the server 1, First, the vibration intensity information creation unit 12a creates the vibration intensity information (logarithm) 12Ta by calculating and normalizing the logarithm of the vibration intensity based on the PSD distribution of the vibration signal input by the water leakage determination unit 11 for each divided frequency band (S41).

Next, the pipe route extraction unit 12c extracts the pipe route from the pipe information 12Tb (S42). Next, the route information creation unit 12d creates the route information 12Td based on the route information on the pipe route extracted by the pipe route extraction unit 12c and the multiple regression model updated by the model update unit 14 (S43).

Next, the estimation unit 12e creates the evaluation result 12Tf including the evaluation index which is the difference between the PSD (normalized) predicted value and the PSD (normalized) measured value in the route information 12Td (S44). Next, based on the evaluation result 12Tf, the search route calculation unit 12g determines a search route including a priority and a search direction of each search route (S45). Finally, the search route calculation unit 12g transmits the determined search route 12Tg and the evaluation result 12Tf to the terminal 3, and causes the search route display unit 30 to display the search route display screen 30A (S46).

In the above embodiment, the pipe route in which the water leakage occurs is estimated based on the measured value of the vibration in the pipe network acquired by the water leakage sensor 2 and the predicted value of the vibration for each pipe route acquirable by the water leakage sensor 2 when the water leakage occurs in each pipe route. Therefore, the inspector can perform an efficient inspection by previously narrowing an inspection range in which the checking inspection is actually performed by the listening stick or the like.

In addition, in the above-described embodiment, since the water leakage sensor 2 is a single sensor provided at one position in the pipe network, it is possible to more accurately estimate the water leakage point of the pipe buried in the ground by using the single sensor provided at one position without using a plurality of sensors.

In addition, in the above-described embodiment, the predicted value of the vibration of the pipe is a value that is output as a predicted value with the route information as input, and that is obtained in correspondence with the input by a prediction model generated based on performance data of a water leakage inspection of searching a water leakage position of a pipe. By calculating the predicted value using the prediction model generated based on the past performance data, reliability of the predicted value reflecting past water leakage cases becomes higher.

In addition, in the above-described embodiment, the route information includes at least one of the pipe length indicating the distance from the water leakage sensor 2 for each pipe type, the pipe diameter for each pipe type, and the number of water control valves, the number of fire hydrants, and the number and type of branches that are present in the corresponding pipe route from the water leakage sensor 2 up to this pipe length. As the number of parameters included in the route information increases, the measured value and the predicted value of the vibration can be served as information with higher accuracy with which an actual situation of the pipe network is finely reflected, and estimation accuracy of the water leakage position can be improved.

In addition, in the above-described embodiment, the measured value and the predicted value of the vibration of the pipe network are sum values obtained by summing the normalized values of the logarithm of the vibration intensity calculated for each frequency band obtained by dividing a target frequency band by a predetermined bandwidth over the target frequency band. By this normalization, it is possible to perform the analysis independent of the absolute value of the vibration intensity (water leakage amount).

Further, in the above-described embodiment, when the difference between the predicted value and the measured value of the pipe network satisfies the predetermined condition, the pipe route corresponding to this predicted value is estimated as the pipe route in which the water leakage occurs, By estimating that the water leakage occurs in the pipe route in which the predicted value output by the prediction model based on the past checking inspection result is a value closer to the measured value, it is possible to perform the checking inspection efficiently by narrowing the inspection range in advance based on the estimation result having the higher reliability and reflecting the water leakage cases.

In addition, in the above-described embodiment, it is possible to estimate the water leakage position in the pipe route estimated as water leakage present from the position corresponding to the pipe length of the route information in which the difference between the measured value and the predicted value of the vibration is the minimum, thereby giving an indication of the search of the water leakage position, and improving efficiency of the water leakage search.

In addition, in the above-described embodiment, since the search route including the pipe route estimated as water leakage present as a target of the water leakage inspection is calculated, the inspector who actually performs the checking inspection can efficiently perform the checking inspection along the presented search route.

In addition, in the above-described embodiment, the search route subjected to the water leakage inspection is calculated by giving priority to the pipe route having the predicted value of the vibration having a smaller difference from the measured value of the vibration among the pipe routes estimated as water leakage present. Therefore, it is possible to present a search route having a high probability that the water leakage position can be found earlier after the search is started.

Other Embodiments

The invention is not limited to the above-described embodiment, and the following embodiments may be implemented.

(1) Number of Water Leakage Sensors

In the above-described embodiment, the water leakage sensor 2 is a single sensor provided in one water control valve in one pipe network. The invention is not limited thereto, and a position where the water leakage sensor 2 is provided is not limited to the water control valve, and may be a fire hydrant, a branch, or any other position. In this case, each pipe route in the pipe network starts from the position where the water leakage sensor 2 is provided. In addition, the water leakage sensor 2 is not limited to the single sensor, and may include a plurality of sensors. The water leakage sensor 2 includes a plurality of sensors, and a majority of the water leakage position estimation results are determined based on the measured values of the sensors, so that it is possible to further improve the estimation accuracy when estimating the pipe route in which the water leakage occurs based on the measured value and the predicted value of the vibration, (2) Measured Value and Predicted Value of Vibration Related to Pipe Network In the above-described embodiment, a sum value of the values (PSD (normalized)) obtained by normalizing the PSD (logarithm) of each divided frequency band over the entire frequency band before the division is used as the measured value and the predicted value of the vibration related to the pipe network. However, the invention is not limited thereto, and a sum value obtained by summing PSD (logarithm) of each divided frequency band over the entire frequency band before the division may be used. In addition, the PSD (logarithm) or the PSD (normalized) of each divided frequency band may be used without using the sum value. By using the PSD (logarithm) or the PSD (normalized) of each divided frequency band and calculating the difference between the measured value and the predicted value for each frequency band, it is possible to reduce an estimation error of the pipe route in which the water leakage occurs and to improve the estimation accuracy.

(3) Number of Pipe Types Included in Route Information

In the above-described embodiment, as shown in the route information 12Td of FIG. 5, the water leakage information 13T of FIG. 6, and the like, one piece of route information includes a pipe of a single pipe type. However, the invention is not limited thereto, and one piece of route information may include a plurality of pipe types. In this case, the "pipe length (m)" is provided for each pipe type.

For example, it is assumed that there is route information including a total pipe length, 25 (m), indicating a distance from the position where the water leakage sensor 2, and this route information includes two pipe types, that is, pipe type=A and pipe type=B. When the pipe type=A has the pipe length=10 (m) and the pipe type=B has the pipe length=15 (m), the pipe from the position where the water leakage sensor 2 is provided to the position of the total pipe length=25 (m) is formed by the pipe type=A having the pipe length=10 (m) and the pipe type=B having the pipe length=15 (m). As described above, by finely setting the pipe length of the route information for each pipe type, the predicted value and the measured value of the PSD can be calculated more precisely, accuracy of the evaluation index which is the difference between the predicted value and the measured value can be improved, and the estimation accuracy of the pipe route in which the water leakage occurs can be improved.

(4) Computer for Implementing Server 1 and Terminal 3

FIG. 12 is a hardware diagram of a computer 5000 that implements the server 1 and the terminal 3. In the computer 5000, a processor 5100, a memory 5200, a storage 5300, a network interface 5400, an input device 5500, and an output device 5600 are connected via a bus 5700. The processor 5100 is, for example, a central processing unit (CPU). The memory 5200 is, for example, a random access memory (RAM). The storage 5300 is a hard disk drive (HDD), a solid state drive (SSD), a medium reading device, or the like. The input device 5500 is a keyboard, a mouse, a touch panel, or the like. The output device 5600 is a display or the like.

In the computer 5000, each program for implementing the server 1 and the terminal 3 is read from the storage 5300 and executed by cooperation of the processor 5100 and the memory 5200, thereby implementing each of the server 1 and the terminal 3. Alternatively, each program for implementing the server 1 and the terminal 3 may be acquired from an external computer by communication via the network interface 5400. Alternatively, each program for implementing the server 1 and the terminal 3 may be recorded in a portable recording medium (an optical disk, semiconductor storage medium, or the like), read by a medium reading device, and executed by the cooperation of the processor 5100 and the memory 5200.

The invention is not limited to the embodiments described above, and includes various modifications. For example, the above-described embodiments have been described in detail for easy understanding of the invention, and the invention is not necessarily limited to those including all the configurations described above. As long as there is no contradiction, a part of the configuration of one embodiment may be replaced with the configuration of another embodiment, and the configuration of one embodiment may be added to the configuration of another embodiment. It is possible to add, delete, replace, integrate, or distribute a configuration to a part of the configuration of each embodiment. The configurations and processes described in the embodiments can be appropriately distributed, integrated, or replaced based on a processing efficiency or a mounting efficiency.

REFERENCE SIGNS LIST

S: water leakage position estimation system
1: server
11: water leakage determination unit
12: water leakage search route determination unit
12a: vibration intensity information creation unit
12b: pipe information storage unit
12c: pipe route extraction unit
12d: route information creation unit
12e: estimation unit
12f: evaluation result storage unit
12g: search route calculation unit
13: water leakage information storage unit
14: model update unit
2: water leakage sensor
3: terminal
30: search route display unit
31: checking inspection data transmission unit

The invention claimed is:

1. A water leakage position estimation system for estimating a water leakage position in a pipe network including a plurality of pipe routes, the water leakage position estimation system comprising:
a determination unit configured to determine whether a water leakage occurs in the pipe network based on a measured value of a vibration related to the pipe network that is acquired by a single sensor of one or more sensors provided in the pipe network; and
an estimation unit configured to estimate, when the determination unit determines that a water leakage occurs in the pipe network, a pipe route in which the water leakage occurs from the plurality of pipe routes based on the measured value and a predicted value of the vibration calculated for each pipe route from an installation position of the single sensor when a water leakage occurs in each pipe route.

2. The water leakage position estimation system according to claim 1, wherein
the measured value is a value associated with route information related to each pipe route of the pipe network, and
the predicted value is a value that is output as a predicted value with the route information as input, and that is obtained in correspondence with the input by a prediction model generated based on performance data of a water leakage inspection of searching a water leakage position of a pipe.

3. The water leakage position estimation system according to claim 2, wherein
for each pipe route, the route information includes at least one of a pipe length indicating a distance from the sensor for each pipe type, a pipe diameter for each pipe type, and the number of water control valves, the number of fire hydrants, and the number and type of branches that are present in the corresponding pipe route from the sensor up to the corresponding pipe length.

4. The water leakage position estimation system according to claim 3, wherein
the measured value and the predicted value are sum values obtained by summing logarithms of intensities of the vibration calculated for frequency bands obtained by dividing a target frequency band by a predetermined bandwidth and normalized values of the logarithms over the target frequency band.

5. The water leakage position estimation system according to claim 4, wherein
when a difference between the predicted value and the measured value satisfies a predetermined condition, the estimation unit estimates the pipe route corresponding to the predicted value as the pipe route in which the water leakage occurs.

6. The water leakage position estimation system according to claim 5, wherein
the estimation unit estimates a position corresponding to the pipe length at which the difference is minimum as a water leakage position in the corresponding pipe route.

7. The water leakage position estimation system according to claim 5, further comprising:
a search route calculation unit configured to calculate a search route including the pipe route in which the occurrence of the water leakage is estimated by the estimation unit as a target of the water leakage inspection.

8. The water leakage position estimation system according to claim 7, wherein
the search route calculation unit calculates the search route subjected to the water leakage inspection by giving priority to a pipe route corresponding to the predicted value having a smaller difference from the measured value among the pipe routes estimated by the estimation unit.

9. The water leakage position estimation system according to claim 8, wherein
the search route calculation unit causes a display unit to display the search route in an identifiable manner.

10. A water leakage position estimation method performed by a water leakage position estimation system configured to estimate a water leakage position in a pipe network including a plurality of pipe routes, the water leakage position estimation method comprising:
a determination step of determining whether a water leakage occurs in the pipe network based on a measured value of a vibration related to the pipe network that is acquired by a single sensor of one or more sensors provided in the pipe network; and
an estimation step of estimating, when it is determined in the determination step that a water leakage occurs in the pipe network, a pipe route in which the water leakage occurs from the plurality of pipe routes based on the measured value and a predicted value of the vibration calculated for each pipe route from an installation position of the single sensor when a water leakage occurs in each pipe route.

11. A water leakage position estimation system for estimating a water leakage position in a pipe network including a plurality of pipe routes, the water leakage position estimation system comprising:
a determination unit configured to determine whether a water leakage occurs in the pipe network based on a measured value of a vibration related to the pipe network that is acquired by a sensor provided in the pipe network; and
an estimation unit configured to estimate, when the determination unit determines that a water leakage occurs in the pipe network, a pipe route in which the water leakage occurs from the plurality of pipe routes based on the measured value and a predicted value of the vibration for each pipe route acquirable by the sensor when a water leakage occurs in each pipe route,
wherein
the measured value is a value associated with route information related to each pipe route of the pipe network, and
the predicted value is a value that is output as a predicted value with the route information as input, and that is obtained in correspondence with the input by a prediction model generated based on performance data of a water leakage inspection of searching a water leakage position of a pipe.

12. A water leakage position estimation system for estimating a water leakage position in a pipe network including a plurality of pipe routes, the water leakage position estimation system comprising:
a server comprising a processor and a memory,
wherein the processor is configured to execute programmed instructions stored in the memory which, when executed by the processor, cause the processor to perform water leakage position estimation operations comprising determining whether a water leakage occurs in the pipe network based on a measured value of a vibration related to the pipe network that is acquired by a single sensor of one or more sensors provided in the pipe network; and estimating, when the determination unit determines that a water leakage occurs in the pipe network, a pipe route in which the water leakage occurs from the plurality of pipe routes based on the measured value and a predicted value of the vibration calculated for each pipe route from an installation position of the single sensor when a water leakage occurs in each pipe route.

* * * * *